United States Patent
Sigler et al.

(10) Patent No.: US 7,510,621 B2
(45) Date of Patent: Mar. 31, 2009

(54) CONDUCTIVE ADHESIVE BONDING

(75) Inventors: David R. Sigler, Shelby Township, MI (US); James G. Schroth, Troy, MI (US)

(73) Assignee: General Motors Corporation, Detroit, MI (US)

( * ) Notice: Subject to any disclaimer, the term of this patent is extended or adjusted under 35 U.S.C. 154(b) by 440 days.

(21) Appl. No.: 10/946,701

(22) Filed: Sep. 22, 2004

(65) Prior Publication Data
US 2006/0060296 A1   Mar. 23, 2006

(51) Int. Cl.
   B32B 37/00   (2006.01)
   B29C 65/00   (2006.01)
(52) U.S. Cl. .................. 156/273.9; 156/379.7
(58) Field of Classification Search ............. 219/85.14, 219/85.15; 156/273.9, 272.2, 379.7
   See application file for complete search history.

(56) References Cited

U.S. PATENT DOCUMENTS

| | | | | |
|---|---|---|---|---|
| 2,286,980 A | * | 6/1942 | Schanz | 219/87 |
| 3,205,337 A | * | 9/1965 | Hiemenz et al. | 219/87 |
| 4,110,505 A | | 8/1978 | Prewo | 428/114 |
| 4,482,600 A | | 11/1984 | Matsumoto et al. | 428/213 |
| 4,650,723 A | | 3/1987 | Furuya | 428/622 |
| 4,678,707 A | | 7/1987 | Shinozaki et al. | 428/323 |
| 4,749,623 A | | 6/1988 | Endo et al. | 428/551 |
| 4,794,050 A | | 12/1988 | Campbell et al. | 428/551 |
| 4,873,149 A | | 10/1989 | Shinoda et al. | 428/609 |
| 4,978,582 A | | 12/1990 | Stamm et al. | 428/551 |
| 5,061,778 A | | 10/1991 | Uchida et al. | 528/45 |
| 5,084,357 A | | 1/1992 | Imai et al. | 428/461 |
| 5,100,737 A | | 3/1992 | Colombier et al. | 428/612 |
| 5,286,417 A | * | 2/1994 | Mahmoud et al. | 252/519.33 |
| 5,418,073 A | | 5/1995 | Loth et al. | 428/625 |
| 5,753,885 A | * | 5/1998 | Iwasa et al. | 219/118 |
| 6,126,865 A | | 10/2000 | Haak et al. | 252/512 |
| 6,146,488 A | * | 11/2000 | Okada et al. | 156/273.9 |
| 6,202,462 B1 | | 3/2001 | Hansen et al. | 72/199 |
| 6,465,110 B1 | | 10/2002 | Boss et al. | 428/608 |
| 2005/0133575 A1 | * | 6/2005 | Gayden et al. | 228/235.2 |
| 2006/0062977 A1 | | 3/2006 | Sigler et al. | 428/209 |
| 2006/0134395 A1 | | 6/2006 | Sigler et al. | 428/220 |
| 2006/0134449 A1 | | 6/2006 | Sigler et al. | 428/621 |
| 2006/0134450 A1 | | 6/2006 | Sigler et al. | 428/621 |

FOREIGN PATENT DOCUMENTS

JP   63-158242   7/1988

(Continued)

OTHER PUBLICATIONS

Machine translation of JP 08109359 2007.*

(Continued)

*Primary Examiner*—John L Goff (57) ABSTRACT

Electrically conductive workpieces with facing surfaces are bonded with an adhesive that is filled with conductive metal particles that are reactive with the surfaces of the workpieces. In the bonding process the surfaces are coated with the adhesive, pressed together and an electric current passed between them to momentarily melt the conductive particles. The molten droplets agglomerate and wet the facing surfaces. When the molten clusters re-solidify, electrically conductive paths are formed between the workpieces. For example, the practice is useful for bonding ferrous-based or aluminum-based alloy sheets, strips or plates in making products such as bipolar plates for fuel cells.

8 Claims, 4 Drawing Sheets

FOREIGN PATENT DOCUMENTS

| | | |
|---|---|---|
| JP | 01-263043 | 10/1989 |
| JP | 02-231134 | 9/1990 |
| JP | 03-193443 | 8/1991 |
| JP | 04-077245 | 3/1992 |
| JP | 04-094928 | 3/1992 |
| JP | 04-282239 | 4/1992 |
| JP | 05-039560 | 2/1993 |
| JP | 05-039561 | 2/1993 |
| JP | 05-138802 | 6/1993 |
| JP | 05-229054 | 9/1993 |
| JP | 05-229055 | 9/1993 |
| JP | 06-198802 | 7/1994 |
| JP | 08109359 A * | 4/1996 |
| JP | 08-224827 | 9/1996 |

OTHER PUBLICATIONS

SAE Technical Paper Series 1999-01-1784, "Cost and Performance for Laminated Steel Body", by Thomas E. Welch and James R. Schwaegler, Proceedings of the 1999 Noise and Vibration Conference (P-342).

www.quietsteel.com/pressrelease-022003.html, MSC Engineered Materials and Solutions Group, "Quiet Steel™ Debuts on 2003 Cadillac (Feb. 20, 2003)".

* cited by examiner

CONDUCTIVE ADHESIVE BONDING

TECHNICAL FIELD

This invention pertains generally to adhesive bonding of facing surfaces of electrically conductive workpieces to improve electrical conductivity through the insulating adhesive layer. More specifically this invention pertains to the use of an adhesive that is filled with conductive metal particles that are momentarily melted during the bonding process to wet the facing surfaces and, upon re-solidification, form many conductive paths between them. As an example, the method is applicable to bond the facing sheets of bipolar current collector plates for fuel cells to improve conductivity within these fuel cell elements.

BACKGROUND OF THE INVENTION

Fuel cells that electrochemically combine hydrogen and oxygen are presently being developed and used for production of electric power in stationary and mobile applications. These power sources comprise a stack of individual cell elements that are designed to deliver a power requirement at a specified voltage. The heart of a cell is a membrane electrolyte and electrode assembly (MEA) comprising, for example, a solid polymer, proton exchange electrolyte membrane with a porous catalytic anode on one side of the electrolyte membrane and a porous catalytic cathode on the other side of the membrane. In an assembly of many such cells, each pair of MEAs is separated by a current collector sheet, sealing gasket, and a current collector plate, sometimes called a bipolar plate.

The bipolar plate comprises two thin, facing metal sheets that are shaped to define a flow path on the outside of one sheet for delivery of fluid fuel, for example hydrogen gas, to the anode of one MEA and a flow path for oxygen, often air, on the outside of the second sheet to the cathode side of another MEA on the opposite side of the plate. When the sheets are joined, the surfaces facing between them accommodate the flow of a dielectric cooling fluid. The plates are made of a formable metal that provides suitable strength, electrical conductivity and resistance to corrosion. Stainless steel sheets (316L alloy) of about 0.15 mm gage are an example of a suitable material.

In one method of construction the opposing sheets are separately formed with their respective flow passages and then attached to each other, facing side to facing side, to make the bipolar plate. Selected bonding portions of the sheets are brazed to make this attachment. The bipolar plates are then assembled with other elements of the fuel cell into a stack of cells sufficient to deliver the electrical power required of the unit. Besides providing flow channels for hydrogen and air on their non-facing sides, the bipolar plates serve as current collectors from cell elements near those sides. The many plates in the stack are connected to an electrical terminal of the stack. In order to function as an efficient current collector there must be a suitable low-resistance electrical connection between the sheets of the bipolar plate. While brazing provides an electrically conductive joint that is very durable, it is an expensive, time consuming process not suitable for producing large numbers of fuel cells. Adhesive bonding provides a much lower cost, high speed joining process suitable for high volume production. However, maintaining acceptable electrical conductivity between the sheets has been difficult. No suitable electrically conductive adhesive has been found.

It is an object of this invention to provide a durable electrically conductive adhesive bond between the sheets of conductive workpieces. As applied to the facing surfaces of the workpieces the adhesive contains fine metal particles that will melt below the melting point of the workpieces and wet their surfaces. As the workpieces are pressed together with the adhesive between them, the particles are momentarily melted to wet the workpiece faces and to form, on re-solidification, many conductive pathways through the adhesive matrix. While initially conceived for fuel cell bipolar plate manufacture, the process is applicable generally to providing electrically conductive adhesive bonds between workpieces.

SUMMARY OF THE INVENTION

A stack of fuel cell elements comprises repeating sequences of membrane-electrode-assemblies, electrically conductive current collector sheets, gaskets, bipolar plates and the like. These elements are usually rectangular in plan view and are made so that when they are arranged and stacked their side edges are substantially aligned. The size and number of the elements is determined by the power requirement of the whole fuel cell. The elements are then pressed and held together with a mechanical clamping apparatus. The elements are clamped with sufficient force so that the gaseous and liquid contents of the cell are confined to their intended channels and flow passages. However, it is still necessary for the facing sheets of each bipolar plate be bonded to keep the coolant within the plates and the fuel and oxidant on outside, non-facing surfaces. Often the bonding is in bands along the edges of the plates and at selected internal bonding locations depending upon shape requirements for external and internal fluid flow passages. Further the bonding material must provide suitable electrical conductivity between contacting portions of the facing sheets.

The adhesive is selected to be applicable to and compatible with the stainless steel or aluminum sheet material of the bipolar plates and the operating environment of the fuel cell. For example, a one-part epoxy composition or a suitable hot melt urethane or acrylic adhesive may be used. The adhesive is mixed with small conductive metal particles that are used to provide enhanced electrical conductivity between the facing surfaces of the bipolar plate sheets. For example, the metal particles are suitably composed of metal alloys or intermetallic compounds including metal elements. Preferably, the metal particles are relatively low-melting in close contact with the workpieces. As the adhesive coated sheets are pressed together to compress and distribute the adhesive film, the small particles bridging the adhesive filled gap are fused by passing an electric current between the workpieces. The molten droplets wet the facing surfaces and depending on the substrate composition, particle composition, and level of current passed through the workpieces, localized melting of the substrate occurs to increase the size of the molten droplet. Removing the current flow causes the droplets to re-solidify into many small conductive columns or links through the adhesive between the sheets. The adhesive is also separately heated to promote flow between the sheet and, if necessary, to cure it.

Thus, the selection of the metal particles normally depends on the material of the bipolar plate. For example, when ferrous metal bipolar sheets are to be bonded, nickel-phosphorus particles or alloy particles from systems that form eutectic alloys with iron, such as the iron-phosphorus, iron-carbon or iron-silicon systems are suitable. Either nickel-phosphorus or the eutectic ferrous alloys or intermetallics are susceptible to melting, wetting and flowing against stainless steel sheet material. After wetting the facing sheet surfaces, the metallic element containing droplets re-solidify to form many conductive paths from sheet to sheet and decrease the electrical resistance inherent in the adhesive bond.

When the bipolar sheets are made of aluminum, aluminum-silicon particles, especially silicon-rich aluminum alloy particles, they are suitable for wetting and providing good electrical connections between the touching sheet portions.

While a practice of the invention is illustrated in the bonding of metal sheets for bipolar plate fuel cell current collectors, it is to be understood that the process is generally applicable to adhesive bonding of electrically conductive workpieces where it is desired to enhance conductivity between the parts. For example, the invention is considered particularly useful in joining workpieces in the form of sheets, strips or plates to form a product with good electrical conductivity between adhesively bonded layers.

Other objects and advantages of the invention will become apparent from a detailed description of preferred embodiments which follow.

DESCRIPTION OF A PREFERRED EMBODIMENT

Figure 1:
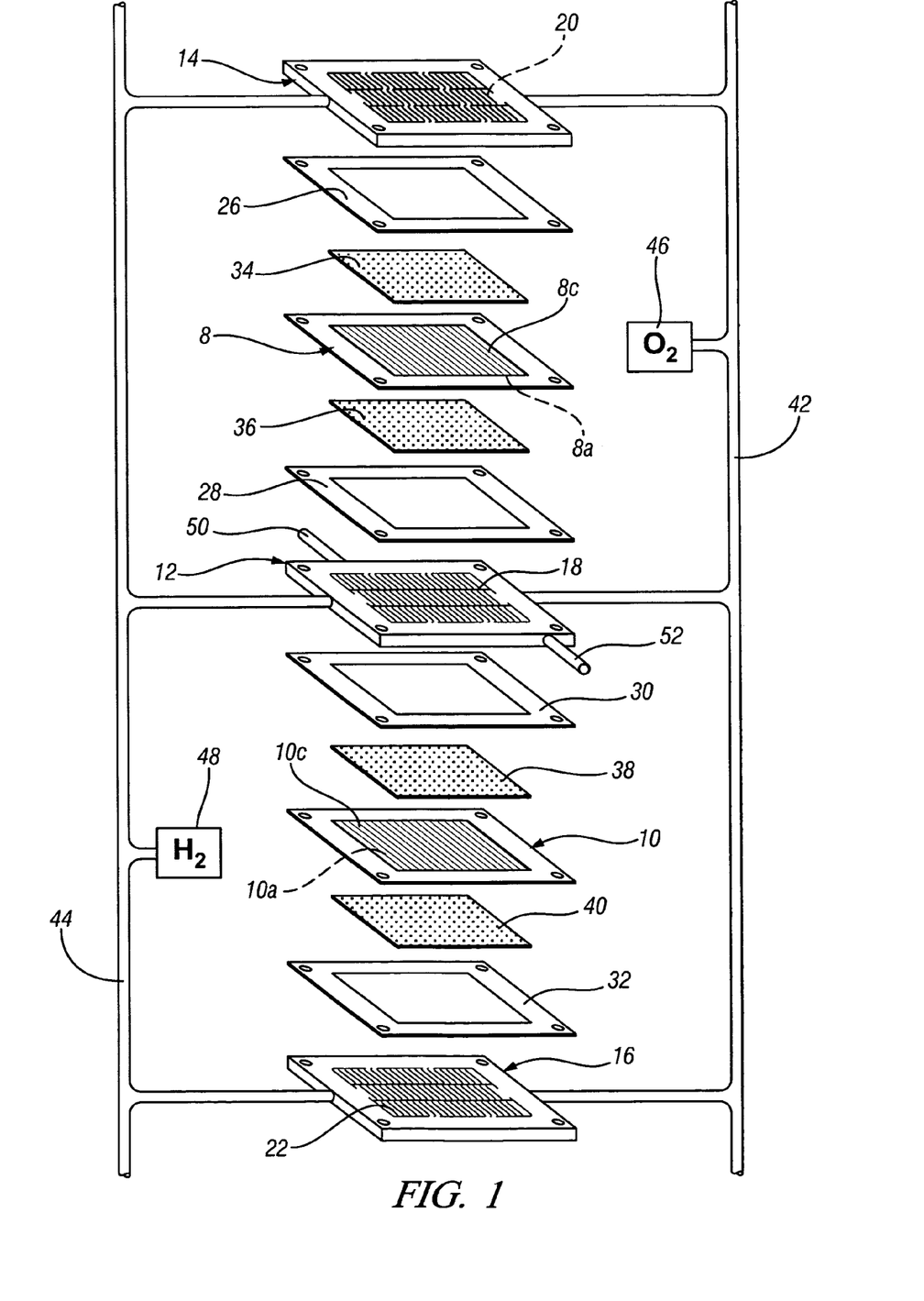
FIG. 1 is an isometric exploded illustration of a fuel cell stack.

FIG. 1 schematically depicts a representative partial fuel cell stack having a pair of membrane-electrode-assemblies (MEAs) 8, 10 separated from each other by a non-porous, electrically-conductive bipolar plate 12. Each of the MEAs 8, 10 have a cathode face 8c, 10c and an anode face 8a, 10a. The MEAs 8, 10, and bipolar plate 12, are stacked together between non-porous, electrically-conductive, liquid-cooled bipolar plates 14, 16. The bipolar plates 12, 14 and 16 each include flow fields 18, 20 and 22 having a plurality of flow channels formed in the faces of the plates for distributing fuel and oxidant gases (e.g., $H_2$ and $O_2$) to the reactive faces of the MEAs 8, 10. Nonconductive gaskets or seals 26, 28, 30 and 32 provide a seal and electrical insulation between the several plates of the fuel cell stack.

Porous, gas permeable, electrically conductive sheets 34, 36, 38 and 40 press up against the electrode faces of the MEAs 8, 10 and serve as primary current collectors for the electrodes. Primary current collectors 34, 36, 38 and 40 also provide mechanical supports for the MEAs 8, 10, especially at locations where the MEAs are otherwise unsupported in the flow field. Suitable primary current collectors include carbon/graphite paper/cloth, fine mesh noble metal screens, open cell noble metal foams, and the like which conduct current from the electrodes while allowing gas to pass through.

Bipolar plates 14 and 16 press up against the primary current collector 34 on the cathode face 8c of MEA 8 and the primary current collector 40 on the anode face 10a of MEA 10. The bipolar plate 12 presses up against the primary current collector 36 on the anode face 8a of MEA 8 and against the primary current collector 38 on the cathode face 10c of MEA 10. An oxidant gas such as oxygen or air is supplied to the cathode side of the fuel cell stack from a storage tank 46 via appropriate supply plumbing 42. Similarly, a fuel such as hydrogen is supplied to the anode side of the fuel cell from a storage tank 48 via appropriate supply plumbing 44. In a preferred embodiment, the oxygen tank 46 may be eliminated, and air delivered to the cathode side from the ambient. Likewise, the hydrogen tank 48 may be eliminated and hydrogen supplied to the anode side from a reformer which catalytically generates hydrogen from methanol or a liquid hydrocarbon (e.g., gasoline). Exhaust plumbing (not shown) for both the $H_2$ and $O_2$/air sides of the MEAs is also provided for removing $H_2$ depleted anode gas from the anode flow field and $O_2$ depleted cathode gas from the cathode flow field. Coolant plumbing 50 and 52 is provided for supplying and exhausting liquid coolant to the bipolar plate 12, as needed. It is appreciated that coolant may additionally or alternatively be provided to the bipolar plates 14 and 16.

Figure 2:
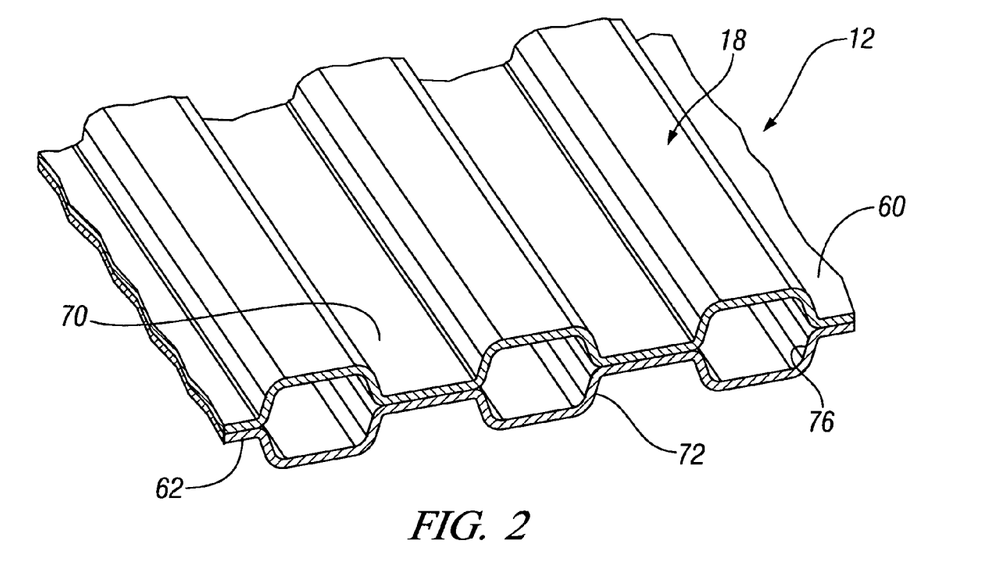
FIG. 2 is a sectional view of a portion of a bipolar plate of FIG. 1.

Turning now to FIG. 2, a fragment of the bipolar plate 12 is shown in greater detail to illustrate shaped patterned regions of two metal sheets into flow passages for fuel, oxidant and coolant.

The bipolar plate 12 generally includes a first and second plate 60, 62. The first and second plate 60, 62 are preferably formed of a conductive material such as aluminum alloy or stainless steel for example. The flow channels 18 of the bipolar plate 12 are further defined by an anode flow field 70 disposed on an outer surface of the first plate 60, a cathode flow field 72 disposed on an outer surface of the second plate 62 and a coolant flow field 76 disposed between the first and second plates 60, 62. In operation, the anode flow field 70 of the first plate 60 distributes the fuel to the anode face 8a of the MEA 8. Similarly, the cathode flow field 72 of the second plate 62 distributes the oxidant gas to the cathode face 10c of the MEA 10. Coolant is communicated through the coolant flow field 76 through the coolant plumbing 50 and 52.

Figure 3:
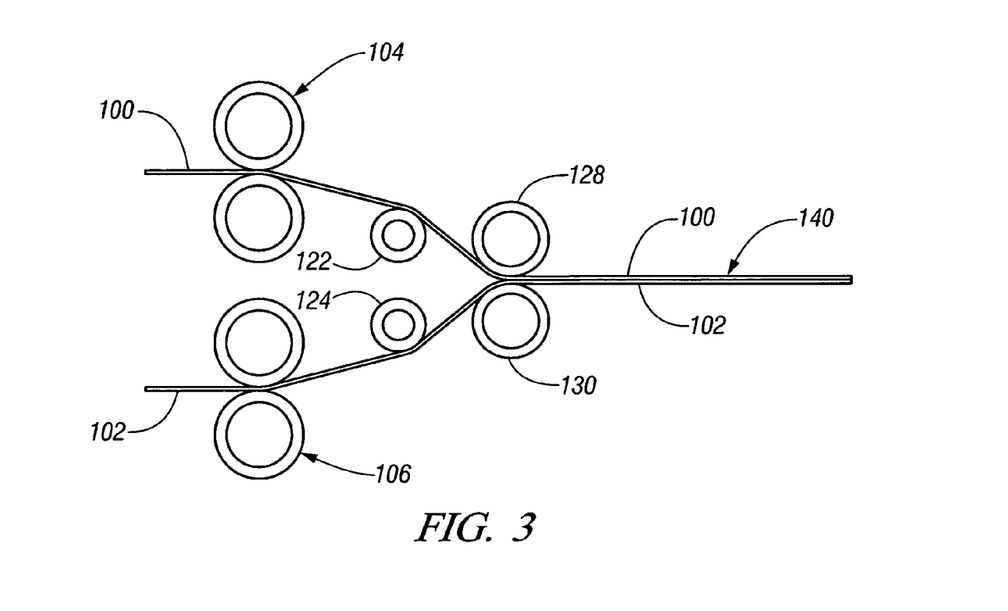
FIG. 3 is a schematic side elevational view illustrating roller equipment for a method of continuously and simultaneously forming several complementary bipolar sheet members with rotary dies in long stainless steel sheets, applying a patterned coating of the conductive particle-containing adhesive of this invention to facing surfaces of formed sheet elements, pressing adhesive coated surfaces between rollers, and passing a current between the adhesive coated sheets to fuse conductive particles in the adhesive into conductive links between the bipolar plate sheets.

In one application, this invention provides a manufacturing process to produce bipolar plates for fuel cell stacks. Reference is made first to FIG. 3 to describe a preferred embodiment of the invention in which separate sheets of the two bipolar plate layers are formed continuously and simultaneously and then adhesively bonded. The metal sheet material is suitably thin gage (0.1 mm) 316L stainless steel or a suitable aluminum alloy. The process commences with the simultaneous and parallel feeding of annealed sheets 100 and 102 into rotary die stands 104 and 106. It is intended that many upper sheets, for example, of a bipolar plate (like plate 12 in FIG. 1) will be formed in sheet 100 and the complementary lower sheets in sheet 102.

Figure 4:
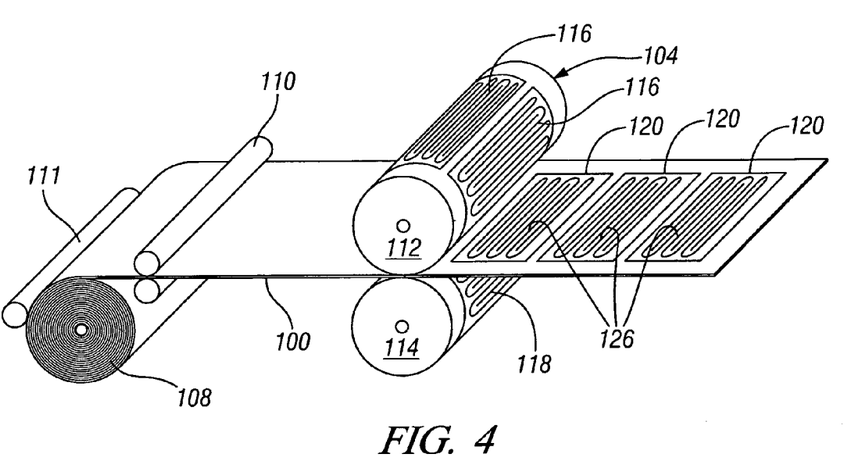
FIG. 4 is a schematic view of a roll of metal sheet and a rotary die assembly for continuous preforming of sheet members for one side of a bipolar cell.

FIG. 4 provides a more detailed illustration of the rotary die forming of flow channels in the sheets for the bipolar plates. Sheet 100 is unwound from coil 108 using feed roller stand 110 and unwind control roller 111. Sheet 100 is passed through rotary die stand 104 with upper roll 112 and lower roll 114. Machined into the circumference of upper roll 112 are repeated patterns 116 for forming the outer surface of an upper bipolar plate sheet. Machined into the circumference of lower roll 114 are repeated complementary patterns 118 for forming the surfaces of an upper bipolar plate sheet. Thus, as sheet 100 passes through rotary die stand 104, there are formed, within sheet 100, regions 120 of fluid channel shapes 126 for a series of upper sheet members for a bipolar plate. Although not shown in detail, the rolls of rotary die stand 106 are configured to continually form repeated channel shapes for a series of lower sheet members of a bipolar plate. As illustrated in FIG. 3, sheets 100 and 102 are advanced together so that their respective channel shaped areas can be brought together for matched face-to-face bonding of selected patterned regions of sheets 100 and 102. Such shaping of repeated channel regions in sheets 100 and 102 can be accomplished at an efficient speed. After two facing regions in sheets 100 and 102 have been adhesively bonded, they are cut from these large sheets as a precursor bipolar plate assembly for finishing operations.

Referring again to FIG. 3, the advancing sheets 100 and 102 are passed into contact with adhesive coating rolls 122, 124. The respective surfaces of rolls 122 and 124 are shaped to apply a coating of adhesive to each of the facing surfaces of sheets 100 and 102 as seen in FIG. 3. A mobile thermoplastic or thermosetting adhesive material containing electrically conductive metal particles is applied as a coating film of suitable thickness. Roller application of the adhesive is illustrated in FIG. 3. But it is to be understood that the conductive particle-filled adhesive may alternatively be applied by other suitable processes such as painting or spraying.

Figure 5:
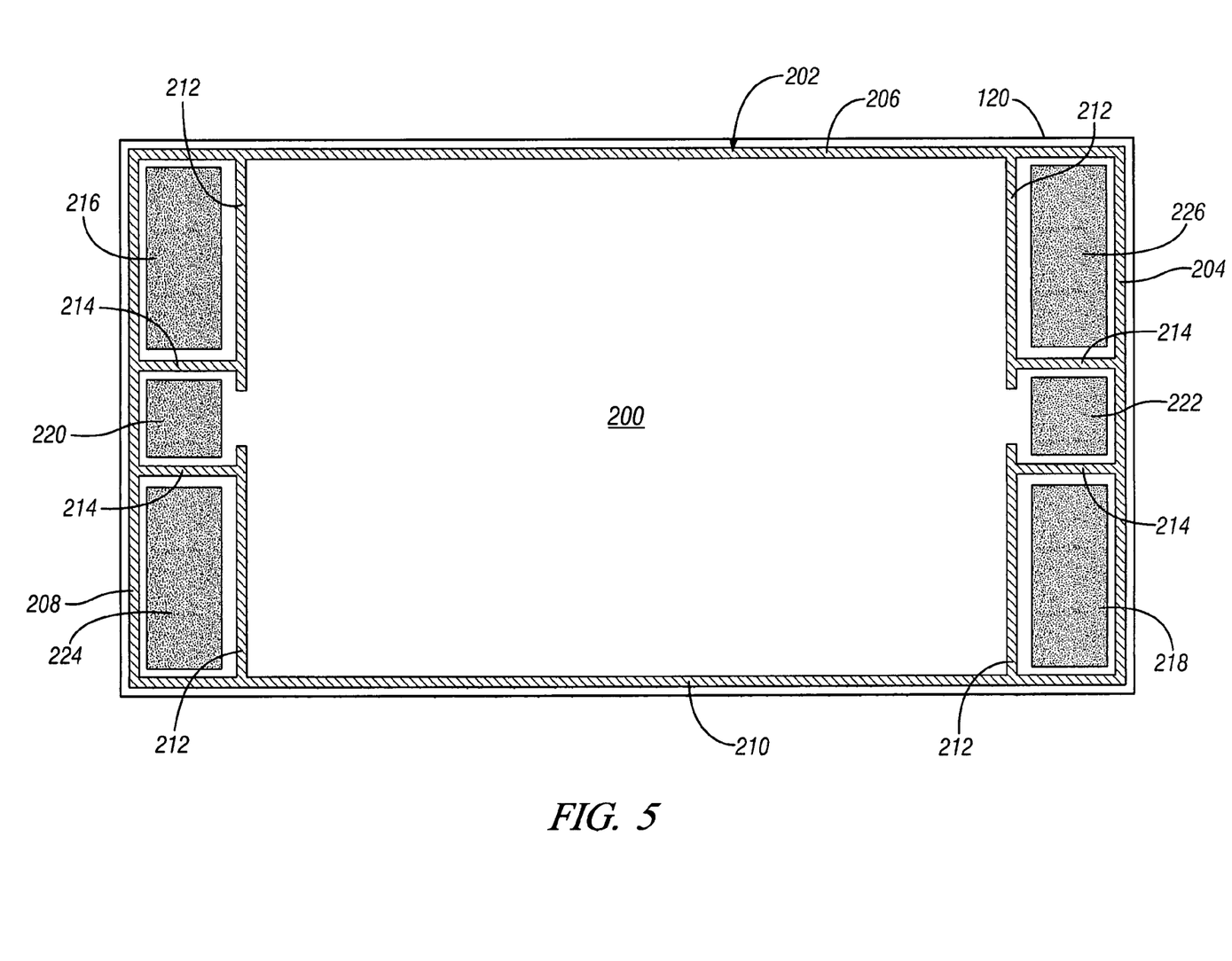
FIG. 5 is a plan view of an individual bipolar plate section within the sheet of FIG. 3 illustrating a representative pattern of applied conductive particle-filled, adhesive material (hatched bands) for bonding to a complementary preformed metal sheet.

The adhesive is applied to sheets 100 and 102 (or at least one of them) in repeated patterns for bonding facing surfaces of the sheets in specified areas. FIG. 5 is a plan view of the regions 120 in sheet 100 showing a suitable pattern for the application of conductive particle-filled adhesive to the bottom surface of sheet 100 as seen in both FIGS. 3 and 4. The adhesive is applied by roller coater 122 having a suitably shaped applicator surface. A similar pattern could be applied to like regions in the top surface of sheet 102 by roller coater 124.

In FIG. 5, shaped region 120 is illustrated in this example as rectangular. It is found that rectangular shaped bipolar plates are convenient for assembling into a fuel cell stack and for handling of the stack. The whole central area 200 of region 120 has been formed by rotary dies into fluid channel shapes such as those illustrated at 126 in FIG. 4. The specific shape of the flow channels in central area 200 is not shown in FIG. 4 so as to more clearly illustrate the adhesive pattern. In this embodiment the shape of the flow channels is not critical to the pattern in which the conductive adhesive is applied. But the specific pattern in which the adhesive is applied is, of course, complementary to the fluid channel pattern. Bands of conductive particle-containing adhesive 202 are applied on a side of sheet 100 to be bonded to a corresponding area of sheet 102.

In this example, the conductive adhesive 202 is applied in a pattern of linear paths (hatched bands in FIG. 5) 204, 206, 208 and 210 around the edges of rectangular region 120 of sheet 100. The conductive adhesive 202 is also applied in four sets of bands 212, 214. Thus, the total pattern of conductive adhesive 202 will be used to bond and seal the peripheral edges of region 120 on sheet 100 to a facing corresponding region on sheet 102. The band pattern of conductive adhesive 202 will also provide a sealing conductive bond around areas where for example, an air inlet 216, an air outlet 218, a coolant inlet 220, a coolant outlet 222, a fuel inlet 224 and a fuel outlet 226 may be cut out from the sheet material in finishing operations for a bipolar plate. The respective inlet and outlet regions 216, 218, 220, 222, 224 and 226 are shown as darkened regions in FIG. 5 because they are ultimately cut out of the sheet material.

Referring again to FIG. 3, the two sheets 100, 102 with their respective adhesive patterns are brought together face-to-face and passed between bonding rolls 128, 130. Rolls 128, 130 apply pressure against the formed lands of channels 126 to push the adhesive coated regions of sheets 100, 102 together and, thus, against the conductive particles. A voltage is applied between the bonding rolls 128, 130 from an electrical power source not shown. Because of the rotation of bonding rolls 128, 130 an electric current is caused to momentarily flow through each advancing increment of adhesive and conductive particles. In another embodiment of the invention, not illustrated in the drawing figures, two sets of rolls are used. A first set of rolls, that could be soft, are used to press the sheets together, and a second set of metal rolls are designed to pass the current through the advancing adhesive bonded sheets.

Figure 6A:
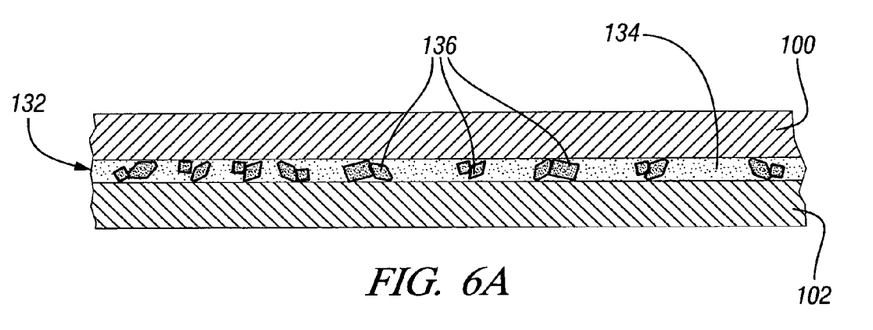
FIG. 6A is a cross-section of a fragment of the adhesive coated sheets showing the conductive particles before they are fused.
Figure 6B:
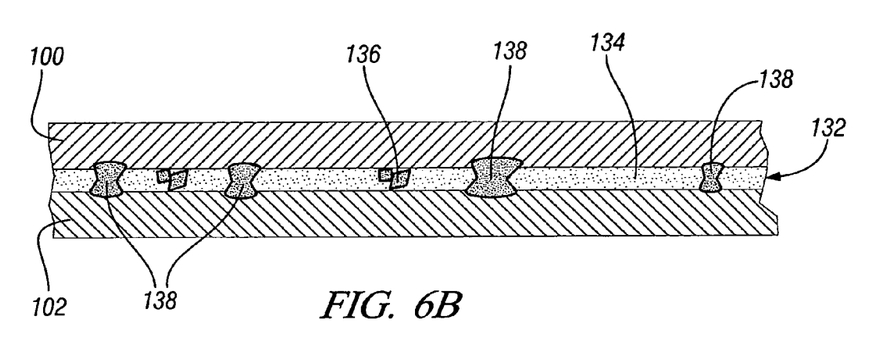
FIG. 6B is a cross-section of a fragment of the adhesive bonded sheets showing the conductive particles after they are fused.

FIGS. 6A and 6B are enlarged schematic representations of fragments of sheets 100 and 102 with a layer of conductive particle-containing adhesive 132 between them. Filled adhesive 132 has an initially mobile thermoplastic or thermosetting adhesive composition vehicle 134 with dispersed particles of conductive metal 136. The pressure of rolls 128 and 130 spreads and evens the thickness of the adhesive vehicle phase between sheets 100, 102. The pressure of the rolls also closes the spacing between sheet 100, 102 to about the diameter or size of the particles 136 as seen in FIG. 6A. Typically, the sheets are quite thin, about 0.15 mm in this example. The thickness of the adhesive layer is less, about 0.01 mm. The metal particles are quite small but present in sufficient abundance to permit initial current flow through the adhesive material between the sheets. The conductive particles melt with current flow, wet the substrate, and locally melt the substrate forming small molten metal connections (ultimately solidifying as solid, electrically conductive metal connections 138) between the bonded portions of mated sheets 100, 102. These molten connections or links then freeze to solid electrically conductive metal connections 138 after the mated sheets 100, 102 move away from the rolls 128, 130 and the electric current flow in that portion of the sheets is stopped. As illustrated schematically in FIG. 6B, metallic connections 138 may have alloyed with and penetrated into the sheets 100, 102. The adhesive vehicle phase 134 can then be set or cured by heating the moving strip 140 of bonded sheets 100, 102 through an oven, not shown, or other suitable heating device. Individual bipolar plate units are then trimmed from the joined sheets.

In another embodiment of this process, individually formed plates, i.e., stamped, pressure formed, etc., are brought together in a batch process with particle-containing adhesive applied to at least one of them. The adhesive is applied in a predetermined pattern by spraying, rolling, or printing it onto the formed sheet surface. Electrically conductive platens or dies are then closed on the two formed sheets to press intended bonding regions together. The platens may have flat surfaces for the flat portions of the sheets or machined portions to fit over formed conduits on the sheet surfaces. Voltage applied across the dies melts the conductive particles to form molten connections between the sheets. The molten metallic element containing connections freeze once current is terminated. After an electrical connection is established, the adhesive material bonding the bipolar plate can be cured in continuous or batch processes.

A key feature of this invention is the ability to obtain good long-term conductivity between the two conductive articles or workpieces, such as in the illustrated application to bipolar plate sheets. The adhesive is by its very nature an insulator. To provide conduction, metallic particles are placed in the adhesive. These would not ordinarily provide significant conduction since they are not in intimate contact with the substrate. Wetting the particles by the adhesive or degradation of particle or sheet surfaces would degrade conductivity, particularly over time. To solve this problem, the process is designed to form solid metal connections or links between the two sheets by melting the particles and then solidifying the molten material. Placing the sheet between rollers or dies insures good electrical contact between many particles and the sheet. A voltage applied across the rolls or dies will then cause current to flow through the particles. The particles will melt, wet the sheet, and grow by alloying with the sheet. Following termination of the current, the molten areas will cool and solidify into multiple parallel links that provide many conduction paths between the two sheets.

Many suitable thermosetting adhesive compositions for metal bipolar sheet bonding are available. For example, epoxy resins, polyurethane resins and acrylic resins are useful. The composition of the electrically conductive particulate material is preferably chosen based on the metal used in the sheets for the bipolar plates. It is preferred that the particulate material interacts with the sheet composition for melting of the particles, accumulation of good conductive paths or links, and the wetting of the sheet material for electrical conductivity after the molten mass from the particles re-solidifies.

Reference has been made to 316L stainless steel as an example of a workpiece material that may be provided with a conductive adhesive bond in accordance with this invention. The nominal composition range of iron based 316L is, by weight, 16-18% chromium and 10-14% nickel with less than 0.03% carbon. As stated, the conductive particles used in the adhesive are usually selected based on the composition of the workpiece material. In this context, references to ferrous-based or aluminum-based workpiece materials, for example, usually mean that the principal metallic element represents half or more of the material to be adhesively bonded.

For ferrous-based sheet, such as 316L stainless steel, the Fe—P intermetallics, Fe—C alloys or Fe—Si alloys, are usually suitable for the use in the conductive particles. Iron phosphides ($Fe_3P$ and $Fe_2P$) have melting points below that of iron, and when they are molten form a eutectic alloy with iron. Fe—C and Fe—Si alloys also have lower melting points than iron. Low melting point iron compounds or alloys, alone or mixed with iron, promote wetting of the stainless steel surfaces. The diffusion of, e.g., carbon or phosphorus, into the ferrous workpiece lowers its melting point and melts/dissolves the substrate in the vicinity of the molten particle. Also particles composed of relatively low melting point Ni—P compositions may be used. The resultant molten metal that connects the two sheets provides a robust conduction path once it solidifies.

For aluminum-based sheet or other workpieces, Al—Si particles, preferably silicon-rich particles close to the Al—Si eutectic of 12.6% Si, are suitable conductive particles for incorporation into an adhesive. Silicon forms a low melting point eutectic with aluminum and the molten aluminum-silicon composition wets and dissolves into the aluminum sheet substrate to form a suitable electrical connection.

To obtain the most consistent, reproducible process the particle size should be closely controlled. Ideally, the particle size should correspond to the adhesive bond line thickness so that individual particles can singly bridge the gap between the two metal sheets. Less preferably, two or more particles in contact would bridge the gap between sheets.

The ideal conductive particle type would have several properties: low melting point relative to the substrate, good wetting of the substrate plate, good electrical conductivity, good ductility or resistance to fracture when subjected to elastic stresses, and acceptable corrosion resistance.

The practice of the invention has been described in terms of a few preferred embodiments. But it is apparent that practice of the invention is generally applicable to conductive workpieces such as metallic workpieces. Thus, other embodiments of the invention could readily be adapted by one skilled in the art. The scope of the invention is limited only by the following claims.

The invention claimed is:

1. A method of forming an electrically conductive adhesive bond between a first bonding surface area on a first metallic member and a second bonding surface area on a second metallic member, the method comprising:

applying a coating of an adhesive composition to at least one of the first and second bonding surface areas, the adhesive comprising electrically conductive particles;

pressing the first and second bonding surface areas together to press the adhesive coating against both surface areas to form an adhesive layer interface between the bonding surface areas and separating them, the electrically conductive particles being dispersed in the adhesive layer interface for providing distinct electrically conductive pathways through the adhesive co-extensive with the bonding surface areas;

applying an electrical potential between the first and second bonding areas and the adhesive coating for a time sufficient to fuse the electrically conductive particles without bringing the bonding surface areas into physical contact with each other; and removing the electrical potential to re-solidify the fused electrically conductive material into a plurality of separate electrical flow paths through a matrix of the adhesive from the first bonding surface area to the second bonding surface area, the adhesive layer between the two bonding surface areas then being bridged by the re-solidified conductive flow paths without direct contact of the bonding surface areas.

2. The method of forming an electrically conductive adhesive bond as recited in claim 1 where the first and second metallic members are in the form of sheets, strips or plates.

3. The method of forming an electrically conductive adhesive bond as recited in claim 1 comprising applying a coating of an adhesive to at least one of the first and second bonding surface areas, the adhesive comprising electrically conductive particles of a material comprising a metallic element, the size of the particles being substantially the same as the thickness of the adhesive bond to be formed between the first and second bonding surface areas.

4. The method of forming an electrically conductive adhesive bond as recited in claim 1 where the first and second metallic members are ferrous-based members and the method comprises applying a coating of a polymeric adhesive to the bonding surface areas, the coating containing distributed particles that comprise a composition selected from the group consisting of iron-silicon intermetallic compounds, iron-phosphorus intermetallic compounds, nickel-phosphorus intermetallic compounds, and eutectic alloys of iron-phosphorus, iron-silicon, iron-carbon, and nickel-phosphorus.

5. The method of forming an electrically conductive adhesive bond as recited in claim 1 where the first and second metallic members are aluminum-based members and the method comprises applying a coating of an adhesive to the bonding surface areas, the coating containing distributed particles that comprise a composition selected from the group consisting of aluminum-silicon compositions.

6. A method of forming an electrically conductive adhesive bond between a first bonding surface area on a first stainless steel sheet and a second bonding surface area on a second stainless steel sheet, the method comprising:
  applying a coating of an electrically non-conductive thermosetting adhesive composition to at least one of the first and second bonding surface areas, the adhesive comprising electrically conductive particles of a material including a metallic element, the size of the particles being no greater than the thickness of the intended adhesive bond to be formed between first and second sheet members;
  pressing the first and second bonding surface areas together to press the adhesive coating between them to form an adhesive layer interface between the bonding surface areas and separating them, the electrically conductive particles being dispersed in the adhesive layer interface for providing distinct electrically conductive pathways through the adhesive co-extensive with the bonding surface areas;
  applying an electrical potential between the first and second bonding areas and the adhesive coating for a time sufficient to fuse the electrically conductive particles without bringing the bonding surface areas into physical contact with each other;
  removing the electrical potential to re-solidify the fused electrically conductive material into separate electrical flow paths through a matrix of the adhesive from the first bonding surface area to the second bonding surface area; and
  separately heating the adhesive layer interface to set the adhesive into an adhesive bond between first and second bonding areas characterized by the distinct electrical flow paths through the adhesive interface, the adhesive layer between the two bonding surface areas then being bridged by the re-solidified conductive flow paths without direct contact of the bonding surface areas.

7. The method of forming an electrically conductive adhesive bond as recited in claim 6 when the first and second stainless steel sheet members have a thickness less than 0.2 mm, the method comprising applying a coating of a heat setting organic adhesive to the bonding surface areas, the coating containing distributed particles that comprise a composition selected from the group consisting of iron-silicon intermetallic compounds, iron-phosphorus intermetallic compounds, nickel-phosphorus intermetallic compounds, and eutectic alloys of iron-phosphorus, iron-silicon, iron-carbon, and nickel-phosphorus.

8. A method of forming an electrically conductive adhesive bond between first and second facing stainless steel sheets of a bipolar plate for a fuel cell, the method comprising:
  stamping channels for fluid flow in non-facing surfaces of each of the first and second sheets; and
  applying a coating of an electrically non-conductive, heat settable, organic adhesive to bonding surface areas of facing surfaces of the first and second sheets, the coating containing distributed electrically conductive particles that comprise a composition selected from the group consisting of iron-silicon intermetallic compounds, iron-phosphorus intermetallic compounds, nickel-phosphorus intermetallic compounds, and eutectic alloys of iron-phosphorus, iron-silicon, iron-carbon, and nickel-phosphorus;
  pressing the first and second bonding surface areas together to press the adhesive coating against both surface areas to form an adhesive layer interface between the bonding surface areas and separating them, the electrically conductive particles being dispersed in the adhesive layer interface for providing distinct electrically conductive pathways through the adhesive layer;
  applying an electrical potential between the first and second bonding areas and the adhesive layer interface for a time sufficient to fuse the electrically conductive particles without bringing the bonding surface areas into physical contact with each other;
  removing the electrical potential to re-solidify the fused electrically conductive material into a plurality of electrical flow paths through a matrix of the adhesive from the first bonding surface area to the second bonding surface area; and
  separately heating the adhesive layer interface to set the adhesive into an adhesive bond between first and second bonding areas characterized by the distinct electrical flow paths through the adhesive interface, the adhesive layer between the two bonding surface areas then being bridged by the re-solidified conductive flow paths without direct contact of the bonding surface areas.

\* \* \* \* \*